July 2, 1963 K. DELLER 3,095,828
MONORAIL VEHICLES
Filed March 15, 1961 2 Sheets-Sheet 1

INVENTOR.
Konrad Deller
BY
Strauch, Nolan + Neale
ATTORNEYS

July 2, 1963  K. DELLER  3,095,828
MONORAIL VEHICLES
Filed March 15, 1961  2 Sheets-Sheet 2

INVENTOR.
Konrad Deller

BY
Strauch, Nolan & Neale
ATTORNEYS

United States Patent Office 3,095,828
Patented July 2, 1963

3,095,828
MONORAIL VEHICLES
Konrad Deller, Cologne-Deutz, Germany, assignor to Alweg-Forschung G.m.b.H., Cologne, Germany, a corporation of Germany
Filed Mar. 15, 1961, Ser. No. 95,915
Claims priority, application Germany Mar. 16, 1960
3 Claims. (Cl. 105—144)

This invention relates to vehicles and more particularly to an improved arrangement of the running gear for monorail vehicles of the so-called monobeam type.

Vehicles of this type straddle a substantially rectangular beam-like supporting structure and are supported by load carrying wheels adapted to ride over the top surface of the supporting beam and lateral stabilizing and guide wheels adapted to ride along the side beam surfaces.

Vehicles of this type have been proposed in which the load carrying wheels and the upper and lower side wheels of each running gear are mounted by means of rockers on a U-shaped running gear frame straddling the beam-shaped supporting structure.

It is very difficult to repair or maintain the running gears of such vehicles. For maintenance and repair purposes the vehicles must be lifted from the supporting beam and extensive assembly work is necessary, as for example, in order to change a tire of the pneumatic tire carrying or side wheels or to change a wheel bearing or the like.

It is the principal purpose and object of the present invention to provide improved vehicle constructions in which the above mentioned disadvantages of the vehicles known in the art are avoided.

In attaining this primary object and other objects, the invention contemplates the provision of a novel vehicle and chassis structure in which, at the front, the floor of the vehicle and the vehicle frame has a tunnel like recess and in which the running gear forms an assembling unit which is brought into the vehicle from its front side.

It is a further object of the invention to provide an improved running gear construction which is constructed as a sub-assembly unit having a frame like member which can easily be mounted to a corresponding frame piece of the vehicle body.

In such a vehicle exchange of a complete running gear can be performed within a short time and with little work. The vehicle needs only to be lifted slightly, as by means of a lifting jack or the like, and after removal of a front cover and disconnection of screws which are easily accessible from the front of the vehicle and which connect the frame of the running gear with the corresponding frame of the vehicle body, the complete running gear can easily be drawn out of the vehicle frontally.

Contrary to the vehicles known in the art, in which the carrying wheels protruding through the floor of the vehicle into the passenger compartment are covered inside of the compartment by a removable wheel box, in this improved structure advantageously a fixed wheel box can be utilized which extends tunnel-like to the front side of the vehicle. This fixed wheel box improves the rigidity of the vehicle body and noises arising from frictional movements between the removable wheel box and the vehicle body are avoided.

It is especially advantageous to secure directly to the running gear frame a central coupling which protrudes through the front cover of the vehicle. By means of this arrangement, forces acting on the coupling are well directed into the body frame without additional structure. Further, this central coupling may be used for moving the running gear into and out of the vehicle and, by connecting the coupling with another vehicle, for transporting the running gear on the supporting beam structure.

A preferred embodiment of the vehicle according to the invention is characterized by bell cranks having double levers and which are pivoted to the running gear frame pivotally about a horizontal axis. On the substantially horizontal levers of these bell cranks, the bearings for the carrying axle are mounted whereas the levers extending downwardly are connected with spring suspension means arranged frontally at the running gear frame by means of drawbars penetrating through the frame. The low arrangement of the spring suspension for the carrying axle has the advantage that the wheel box protruding into the passenger compartment can be kept small and that the center of gravity of the vehicle is lower. This is especially favorable for monorail vehicles of this type. The spring suspension means, preferably performed as air suspension means, and which are arranged at the downwardly extending legs of the U-shaped running gear frame, are easily accessible and can easily be supervised after removing of the frontal covering of the vehicle and without the necessity of disassembly of the running gear unit.

Additional objects and advantages will become apparent as the description proceeds in connection with the accompanying drawings in which.

Figure 1:
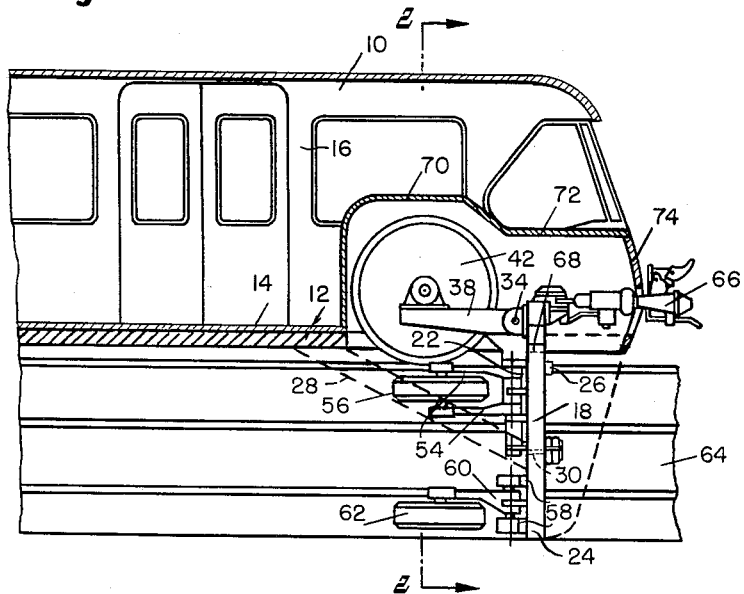
FIGURE 1 is a side elevation, partly in section, of the front part of a monorail vehicle the lower part of the side panels of which have been removed for clarity.
Figure 2:
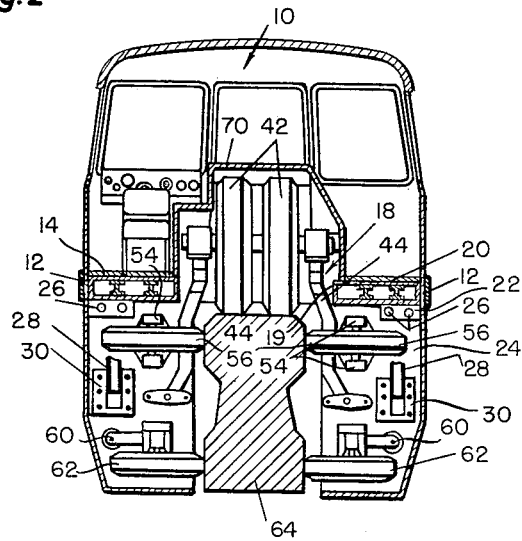
FIGURE 2 is a cross section of the vehicle substantially along line 2—2 of FIGURE 1.

Now referring more particularly to FIGURES 1 and 2, the vehicle body, generally designated by numeral 10, has a body frame 12 made of a riveted or welded girder structure which is located underneath the floor 14 of the passenger compartment 16. In the front part of the vehicle, i.e. within the region of the running gear unit generally designated by numeral 18 and described in more detail in connection with FIGURES 3 and 4, the body frame 12 extending laterally underneath the whole floor 14 has a substantially rectangular recess 19 and extends longitudinally only along the sides of the vehicle as shown in FIGURE 2 by numeral 20. Welded to the underside of the extension 20 of the body frame are angle pieces 22 to which the U-shaped running gear frame 24 (best shown in FIGURE 4) of the running gear unit 18 is screwed by means of bolts 26. In addition to this connection, the running gear frame 24 is secured to the body frame at each side of the unit 18 by means of a connecting girder 28 of which one end is fixed to the underside of the body frame 12, as by welding, and the other end of which is detachably secured to the running gear frame 24 by bolts 30.

Figure 3:
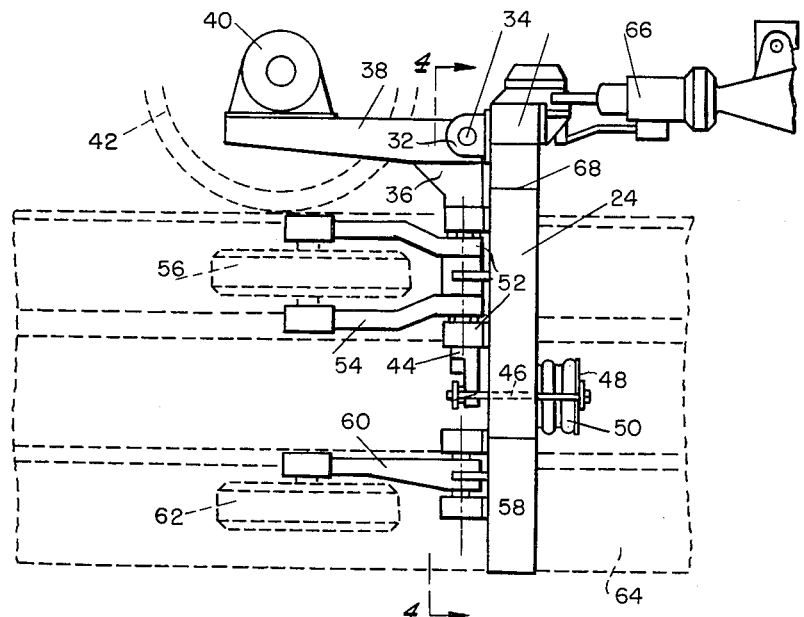
FIGURE 3 is a side elevation of the running gear unit.
Figure 4:
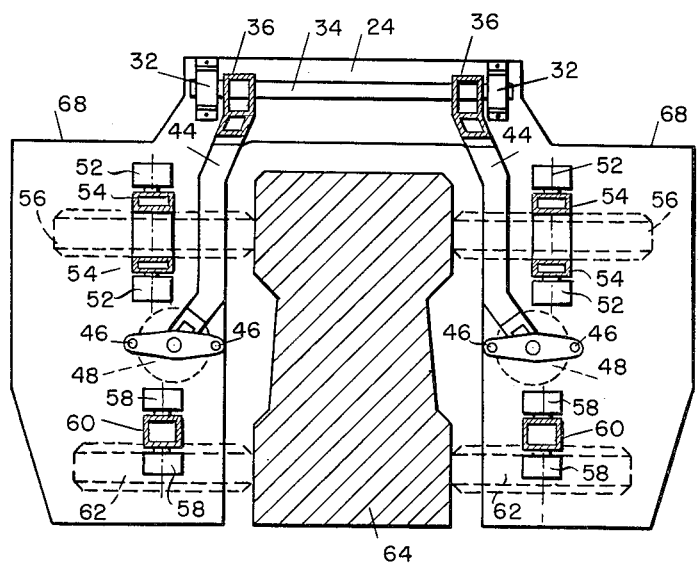
FIGURE 4 is a section substantially along line 4—4 of FIGURE 3.

In FIGURES 3 and 4 the running gear unit per se is shown. This unit comprises the running gear frame 24 to which, by means of brackets 32 on a common axle 34, bell cranks 36 are pivotally connected. The horizontal arms 38 of bell cranks 36 carry the bearings 40 for the load carrying wheels 42. The downwardly extending arms 44 of bell cranks 36 carry at their ends drawbars 46 penetrating through the frame 24. At their opposite ends, the drawbars 46 carry disc-like plates 48 between which and the frame 24, air bellows 50 of an air suspension system are arranged. Also pivotally connected to the frame 24 in brackets 52 are rocker arms 54 for the upper side wheels 56 and brackets 58 for the pivotal connection of rocker arms 60 for the lower side wheels 62. The spring suspension for the side wheels 56 and 62 does not form part of this invention and for clarity is not shown in the figures. The load carrying wheels 42 run on the top surface of the running beam 64 whereas the side wheels 56 and 62 contact the side surfaces of this beam. A central coupling 66 is secured to the top of the frame 24. In the assembled condition of the running gear unit in the vehicle, the extensions 20 of the body frame rest on the recessed surfaces 68 of the running gear frame 24.

Now referring again to FIGURES 1 and 2, the load carrying wheels 42 are covered with respect to the passenger compartment 16 by means of a wheel-box 70 which extends tunnel-like to the front of the vehicle as shown by numeral 72. On the front of the vehicle a cover 74 is provided through which the coupling 66 penetrates.

When the running gear unit has to be exchanged, the vehicle is slightly lifted by a lifting jack e.g. interposed between the body frame 12 and the supporting beam 64. Then after removing the front cover 74 and disconnecting the bolts 26 and 30, the complete running gear unit 18 can easily be drawn out of the vehicle and replaced by a new one.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A monobeam vehicle assembly comprising a vehicle body, means including a downwardly facing U-shaped wheel box forming a recess in said body extending longitudinally thereof and opening at the front thereof, a U-shaped running gear frame, load carrying wheels spring-suspended on said frame, side wheels mounted on said frame, and means detachably and rigidly securing said frame to said vehicle body within said recess to dispose said frame transversely of said vehicle body and said running wheels within said wheel box whereby said frame and said wheels may be detached from said vehicle body and withdrawn as a unit through the open end of said recess.

2. A monobeam vehicle assembly comprising a vehicle body, means forming a recess in said body extending longitudinally thereof and opening at the front thereof, a U-shaped frame, load carrying wheels spring-suspended on said frame, side wheels mounted on said frame, means detachably and rigidly securing said frame to said vehicle body within said recess to dispose said frame transversely of said vehicle body whereby when said frame is detached from said vehicle body said frame and said wheels may be withdrawn through the open end of said recess, and a central coupling secured to said frame and projecting from the front end of said vehicle.

3. A monobeam vehicle assembly comprising a vehicle body, means forming a recess in said body extending longitudinally thereof and opening at the front thereof, a U-shaped running gear frame, a double armed bell crank mounted for movement about a horizontal axis on said frame, one of said arms being substantially horizontal, load carrying wheels supported on the free end of said one arm, the other of said arms extending downwardly along said frame, means resiliently connecting the lower portion of said other arm to said frame, side wheels mounted on said frame, and means detachably and rigidly securing said frame to said vehicle body within said recess with said frame extending transversely of said body and said wheels being disposed rearwardly of said frame, said frame together with said wheels being movable bodily outwardly through the forward end of said recess when said frame is detached from said body.

References Cited in the file of this patent

UNITED STATES PATENTS

| | | |
|---|---|---|
| 502,411 | Flohr | Aug. 1, 1893 |
| 1,049,782 | Valentine | Jan. 7, 1913 |
| 1,086,890 | Brown | Feb. 10, 1914 |
| 1,781,334 | Liechty | Nov. 11, 1930 |